United States Patent [19]

Stamires et al.

[11] 4,362,652

[45] Dec. 7, 1982

[54] CRACKING CATALYSTS CONTAINING SILICA-ALUMINA GELS

[75] Inventors: Dennis Stamires, Newport Beach; Hamid Alafandi, Woodland Hills, both of Calif.

[73] Assignee: Filtrol Corporation, Los Angeles, Calif.

[21] Appl. No.: 281,403

[22] Filed: Jul. 8, 1981

Related U.S. Application Data

[63] Continuation-in-part of Ser. No. 81,655, Oct. 4, 1979, Pat. No. 4,310,441, which is a continuation-in-part of Ser. No. 3,879, Jan. 16, 1979, Pat. No. 4,238,360, which is a continuation-in-part of Ser. No. 935,628, Aug. 21, 1978, Pat. No. 4,239,651, which is a continuation-in-part of Ser. No. 874,755, Feb. 3, 1978, Pat. No. 4,198,319, which is a continuation-in-part of Ser. No. 769,118, Feb. 16, 1977, Pat. No. 4,142,995.

[51] Int. Cl.³ .................... B01J 21/12; B01J 23/10; B01J 37/02

[52] U.S. Cl. .................... 252/453; 252/455 R
[58] Field of Search ................. 252/453, 455 R

[56] References Cited

U.S. PATENT DOCUMENTS

| | | | |
|---|---|---|---|
| 3,193,511 | 7/1965 | Cramer et al. | 252/453 |
| 3,451,947 | 6/1969 | Michael | 252/453 |
| 3,496,116 | 2/1970 | Anderson et al. | 252/453 |
| 4,238,360 | 12/1980 | Alafandi et al. | 252/455 R |
| 4,310,441 | 1/1982 | Alafandi et al. | 252/453 |

*Primary Examiner*—Carl F. Dees
*Attorney, Agent, or Firm*—Paul E. Calrow; Andrew E. Barlay

[57] ABSTRACT

This invention relates to the production of a cracking catalyst derived from hydrothermal treatment of an ammoniated silica-alumina gel, the alumina component of which is formulated from a mixture of anionic and cationic aluminum containing salts.

5 Claims, No Drawings

CRACKING CATALYSTS CONTAINING SILICA-ALUMINA GELS

This application is a continuation-in-part of application Ser. No. 081,655, filed Oct. 4, 1979, now U.S. Pat. No. 4,310,441 which is a continuation-in-part application of Ser. No. 769,118, filed Feb. 16, 1977 now U.S. Pat. No. 4,142,995 (issued Mar. 6, 1979), and Ser. No. 874,755, filed Feb. 3, 1978 now U.S. Pat. No. 4,198,319 (issued Apr. 15, 1980), Ser. No. 935,628, filed Aug. 21, 1978 now U.S. Pat. No. 4,239,651 (issued Dec. 16, 1980), and Ser. No. 003,879, filed Jan. 16, 1979 now U.S. Pat. No. 4,238,360 (issued Dec. 9, 1980).

BACKGROUND OF THE INVENTION

Applicants have discovered (see parent Patent No. 4,238,360) that ammoniated cogels of the $SiO_2/Al_2O_3$ ratio in the range of less than 3 and preferably more than about 1 when exchanged with a monovalent or polyvalent cation, preferably a rare earth cation, to reduce the $NH_3$ content to less than 0.3 equivalents per mol of $Al_2O_3$ have substantially improved cracking activity as compared with the ammoniated cogel prior to such exchange. The prior art relating to the use of silica-alumina gels as cracking catalyst is cited in the parent U.S. Pat. No. 4,238,360.

STATEMENT OF THE INVENTION

We have discovered that the amplification of catalytic cracking activity which is caused by hydrothermal treatment of ammoniated cogels of which the $SiO_2/Al_2O_3$ molar ratio is more than about 1 and less than about 3 is obtained whether the cogel is obtained from an alumina source which is either cationic or anionic, or obtained from a mixture of anionic and cationic alumina sources.

The catalysts formulated from the exchanged gels of our invention whether formed from cationic, anionic or mixed anionic and cationic aluminum source, are distinguished from catalysts formulated from exchanged zeolites in that they are of a superior order of hydrothermal stability. That is, steaming depreciates their activity in a substantially lesser degree than in the case of catalysts produced from a faujasite type zeolite exchanged with rare earth.

This is evidenced by a substantially small difference between M activity where the catalyst is steamed at 1450° F. for two hours (M activity) as compared with the activity after steaming at 1500° F. (S activity) for two hours and the activity after steaming for two hours at 1550° F. (S+ activity).

Gels of the above characteristics may be made according to our invention by reacting sodium silicate with an alumina source including, for example, both anionic aluminum, for example sodium aluminate, and cationic aluminum, i.e., an aluminum salt for example an aluminum salt of a mineral acid such as $H_2SO_4$, HCl, or $HNO_3$, to give a gel of the above nominal molar $SiO_2$ to $Al_2O_3$ ratio by limiting the ratios of the anionic aluminum source to the cationic aluminum source such that the equivalent weight of the $Al_2O_3$ provided by the anionic alumina source is less than 95% and more than 50% of the total equivalent weight of the $Al_2O_3$ in both alumina sources.

The gels thus produced which employ ammonium hydroxide in the gel precipitation step are referred to herein as ammoniated gels (see in this connection, the parent U.S. Pat. No. 4,239,360). Such gels contain a substantial amount of $NH_4$ cations.

Hydrothermal treatment with water solutions containing either monovalent or polyvalent cations causes a reduction in the $NH_3$ content and improves the catalytic activity of the treated gel.

Depending on the nature of the cation, the temperature maintained during the hydrothermal treatment, and the reduction in $NH_4$ equivalents per mol of $Al_2O_3$, the treatment results in a substantial improvement in the activity of the catalyst in cracking processes.

For production of a cracking catalyst for petroleum hydrocarbons or oils produced from coal, shale ore, or tar sands, we prefer to employ water solutions containing rare earth cations for the hydrothermal treatment of the cogel. Upon hydrothermal treatment, the gel is separated from the mother liquor and incorporated in a matrix. We may employ the matrix in the ratios from about 5% to about 90% of the matrix and from about 95% to about 10% of the pressure treated gel. The matrix material may consist of kaolin clays, for example, ball clay or halloysite or acid treated halloysite. The art of incorporating matrix materials with active catalysts is well known.

The following example illustrates processes by which the catalysts of our invention may be formed. In each of the following examples, in producing the cogel to be processed the ratio of the weight of the sodium silicate expressed as $SiO_2$ on a volatile free basis and the weight of the aluminum salt or the aluminate source or both the aluminum salt and aluminate expressed as $Al_2O_3$ on a volatile free basis were used so as to establish in the reaction mixtures, the equivalent of 52 weight percent of $Al_2O_3$ and the equivalent of 48 weight percent of $SiO_2$, both taken on an anhydrous basis, the sum of the equivalent weights of $Al_2O_3$ and the $SiO_2$ being 100%.

EXAMPLE 1

To make 1000 V.F. grams of gel, 1660 grams of N-Brand (sodium silicate, 28.9% $SiO_2$) are diluted to a 2% $SiO_2$ solution with 22,300 grams of water. The solution is stirred for 20 minutes after which the pH is adjusted to 11.0 with sulphuric acid. A pH of 11.0 and a temperature of 100° F. is maintained for half an hour. To this solution the aluminum salt is added in the anionic/cationic ratio desired, the anionic component as sodium aluminate and the cationic component as aluminum sulfate. An 85/15 formulation would be constructed as follows (85% of the weight of the alumina employed in making the gel is from the anionic alumina and 15% from the cationic alumina):

1010 grams of sodium aluminate (43.7% alumina) are dissolved in 21,000 grams of water to make a 2% solution of alumina. This solution is then added to the sodium silicate solution under high agitation. 460 grams of aluminum sulfate (17% alumina) are dissolved in 2660 grams of water to yield a 2.5% solution of cationic alumina. This solution is also added to the sodium silicate solution under high agitation. The pH is then adjusted to 5.5 and a temperature of 100° F. is maintained for 1 hour. The whole mass is then Moorehouse milled in a colloid mill to a degree sufficient to raise the temperature of the gel by about 30° F. The gel is then once again subjected to high agitation and the pH adjusted to 9.5 with a 22% solution of $NH_4OH$. A temperature of 70°–75° C. is maintained for 1 hour at this pH. The gel is once again Moorehouse milled at $\Delta T = 30°$ F. to insure homogeneity. The mother liquor is filtered out.

The filtrate is reslurried in about 25 liters of water and filtered again. A small portion thereof is thoroughly washed, i.e., substantially Na$_2$O and SO$_4$ free. The gel is pressure exchanged. The 1000 V.F. grams of gel are slurried in a solution containing 600 grams of rare earth chloride and diluted in enough water to yield a 4.5% solids containing solution. The gel is slowly added to the rare earth salt solution to allow constant adjustment of the pH with HCl to maintain a pH=4.5. The slurry is then allowed to soak for 12 hours. The gel slurry is charged into the autoclave, the system allowed to attain 335° F. and maintained at that temperature for 3 hours. It is then discharged, immediately filtered and subsequently washed Cl$^-$ free.

Three samples of the gel were made according to the above procedure. The gel samples were combined and mixed with acid treated halloysite in the ratio of 9 parts of gel to 1 part halloysite on a volatile free basis (see parent application, Ser. No. 081,655) and spray dried. The catalyst was tested for M, S, S+ activity. (The results are tabulated in Table 1.)

EXAMPLE 2

The procedure in Example 1 is followed with the following exception, thereby entailing the preferred embodiment:

The anionic/cationic alumina ratio is 75/25, requiring 892 grams of sodium aluminate in 18,600 grams of water and 764 grams of aluminum sulfate in 4400 grams of water. Two samples were separately pressure treated, combined and tested. Furthermore, for comparison, a sample of gel prior to hydrothermal treatment with rare earth cations, was combined with the acid treated halloysite in the 90/10 ratio and spray dried.

The relevant data is as follows in Table 1.

EXAMPLE 3

The procedure in Example 1 is followed with the following exception:

The anionic/cationic alumina ratio is 65/35 requiring 773 grams of sodium aluminate in 16,100 grams of water and 1070 grams of aluminum sulfate in 6200 grams of water. Three samples of the gel were made, separately treated, combined to form the catalyst and tested as in Example 1.

The relevant data is tabulated in Table 1.

EXAMPLE 4

The procedure in Example 1 is followed with the following exception:

The alumina source is completely cationic, therefore 3060 grams of aluminum sulfate are dissolved in 17,700 grams of water. Two samples were made, treated, combined with halloysite to form the catalyst, spray dried and tested. Once again, for comparison, a sample of unexchanged gel was combined with acid treated halloysite in a 90/10 ratio and spray dried.

The relevant data is tabulated in Table 1 as follows.

TABLE 1

| Example No. | Al$_2$O$_3$ Source anionic/cationic | Hydrothermal treatment with REO solution | eq NH$_4$ moles of Al$_2$O$_3$ | Ave. Activity | | |
|---|---|---|---|---|---|---|
| | | | | M | S | S+ |
| 1 | 85/15 | yes | 0.10 | 62 | 54 | 45 |
| 2 | 75/25 | yes | 0.08 | 65 | 55 | 49 |
| 2 | 75/25 | no | 0.55 | 22 | 13 | 9 |
| 3 | 65/35 | yes | 0.08 | 61 | 52 | 44 |
| 4 | 0/100 | yes | 0.15 | 59 | 54 | 46 |

TABLE 1-continued

| Example No. | Al$_2$O$_3$ Source anionic/cationic | Hydrothermal treatment with REO solution | eq NH$_4$ moles of Al$_2$O$_3$ | Ave. Activity | | |
|---|---|---|---|---|---|---|
| | | | | M | S | S+ |
| 4 | 0/100 | no | 0.44 | 43 | | 40 |

The values tabulated in Table 1 show the superior activity of the preferred embodiment of 75/25 (anionic to cationic alumina source ratio) as compared to catalyst containing no anionic alumina and even catalysts containing anionic alumina in other ratios.

APPENDIX

Micro-Activity Test

A test oil (ASTM Subcommittee D-32, Standard FHC 893) is vaporized and passed through a bed of microspheres produced by spray drying of the catalyst. Spray dried microspheres of the catalyst are of a particle size within the range of 50–70 microns.

The catalyst charge is 4.00±0.05 grams and 1.33±0.03 grams of oil is passed through the catalyst bed over a period of 75 seconds. The catalyst is prepared by heating a shallow bed of the catalyst for three (3) hours in air at 1050° F. and then steamed for two (2) hours at 1450° F. and another sample is steamed at 1500° F. for two (2) hours and another sample is steamed at 1550° F. for two (2) hours. The oil is passed through a preheat zone and through a bed of microspheres maintained at a temperature of 900°±2° F. at a weight hourly space velocity (WHSV) of 16.

The vapors and gases passing from the bed are condensed in an ice bath and the uncondensed gases collected over water.

The following observations are made. The weight of the condensate and the volume and temperature of the gases are determined. The liquid condensate fraction is analyzed and the percent by weight of the liquid fraction which is boiled above 421° F. is determined. The volume and temperature of the gases collected over the water are measured and the volume reduced to standard conditions. The uncondensed gases are analyzed and the weight percent of the gases which are hydrogen, isopentane, and hexanes, is determined and their weight percent of the feed determined.

The weight percent of the liquid charge is determined from the following relation:

F is the weight of the oil passing through the reactor;
L is the weight of the liquid product which is collected as condensate;
R is the percent by weight of the fraction of the liquid condensate which boils above 421° F.;
H is the grams liquid held up in the reactor exit line and around the reactor, receiver and joints.

In the above test it has been determined that it constitutes three percent (3%) of the feed F. The weight percent conversion (% C) is given by the following relationship.

$$\% C = \frac{F - \frac{R \times L}{100} - H}{F} \times 100$$

The conversion using the catalyst steamed at 1450° F. is termed M conversion, the one steamed at 1500° F. is termed S conversion, and the one steamed at 1550° F. is termed S+ conversion.

We claim:

1. A method of producing silica-alumina catalyst which comprises mixing in a reaction mixture sodium silicate with a combination of anionic and cationic aluminum salts in such amounts as to provide an $SiO_2/Al_2O_3$ mole ratio in the mixture in the range of about 1 to 3 moles of $SiO_2$ per mole of $Al_2O_3$ based on the total $Al_2O_3$ content of the combination of anionic and cationic aluminum salts; of the total quantity of $Al_2O_3$ provided by the combination of aluminum salts, less than 95% by weight and more than 50% by weight is selected from anionic aluminum salts, the balance from cationic aluminum salts; adding ammonium hydroxide to the said mixture and adjusting the pH in the mixture to a range of about 9 to about 10, thereby forming an ammoniated silica-alumina gel, separating said gel and mixing said gel with a water solution of a polyvalent or a monovalent cation other than alkali metal cation, subjecting said solution to hydrothermal treatment at superatmospheric pressure and reducing the $NH_4$ content associated with said ammoniated gel to substantially less than 0.3 equivalents of $NH_4$ per mole of $Al_2O_3$, separating and drying said gel.

2. The process of claim 1, wherein the quantity of $Al_2O_3$ provided by the anionic aluminum salt is 85% of the total.

3. The process of claim 1, wherein the quantity of $Al_2O_3$ provided by the anionic aluminum salt is 75% of the total.

4. The process of claim 1, wherein the quantity of $Al_2O_3$ provided by the anionic aluminum salt is 65% of the total.

5. The process of claim 1, wherein the water solution of the polyvalent cation is an aqueous rare earth metal solution.

* * * * *